US012700137B1

(12) United States Patent
Irony et al.

(10) Patent No.: US 12,700,137 B1
(45) Date of Patent: Aug. 4, 2026

(54) TRANSITIONING BETWEEN SETS OF IMAGE SENSORS

(71) Applicant: Apple Inc., Cupertino, CA (US)

(72) Inventors: Dror Irony, Rishon le Zion (IL); Ariel Landau, Tel Aviv (IL); Jonathan B. Marsden, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 18/678,997

(22) Filed: May 30, 2024

Related U.S. Application Data

(60) Provisional application No. 63/470,744, filed on Jun. 2, 2023.

(51) Int. Cl.
| | |
|---|---|
| *G06T 7/73* | (2017.01) |
| *G06T 3/20* | (2006.01) |
| *G06T 3/60* | (2024.01) |
| *G06T 7/292* | (2017.01) |
| *H04N 13/243* | (2018.01) |

(52) U.S. Cl.
CPC .................. *G06T 7/74* (2017.01); *G06T 3/20* (2013.01); *G06T 3/60* (2013.01); *G06T 7/292* (2017.01); *G06T 2207/10012* (2013.01); *G06T 2207/30196* (2013.01); *H04N 13/243* (2018.05)

(58) Field of Classification Search
CPC .... G06T 7/74; G06T 3/20; G06T 3/60; G06T 7/292; G06T 2207/10012; G06T 2207/30196; H04N 13/243
See application file for complete search history.

(56) References Cited

U.S. PATENT DOCUMENTS

| | | | | |
|---|---|---|---|---|
| 10,706,587 B1 * | 7/2020 | Sorgi | ........................ | G06T 7/80 |
| 11,442,463 B1 * | 9/2022 | Fotland | ................. | G06V 20/10 |
| 12,511,784 B1 * | 12/2025 | Edwin | ....................... | G06T 7/85 |
| 2019/0313082 A1 * | 10/2019 | Kim | ..................... | H04N 13/239 |
| 2022/0007007 A1 * | 1/2022 | Li | ............................ | G06T 7/80 |
| 2023/0080288 A1 * | 3/2023 | Berkovich | ......... | G02B 27/0172 |
| | | | | 348/38 |
| 2026/0062002 A1 * | 3/2026 | Hochman | ........... | B60W 30/146 |

* cited by examiner

*Primary Examiner* — Delomia L Gilliard
(74) *Attorney, Agent, or Firm* — Fernando & Partners, LLP

(57) ABSTRACT

A method includes determining a first position of an object based on a first set of images captured by a first subset of the plurality of image sensors. The first subset is associated with a first field of view (FOV). The method includes determining a second position of the object based on a second set of images captured by a second subset of the plurality of image sensors. The second subset is associated with a second FOV that is different from the first FOV and the second position is different from the first position. The method includes applying a rigid transformation to the second position when the object is in the second FOV and not in the first FOV.

20 Claims, 7 Drawing Sheets

300

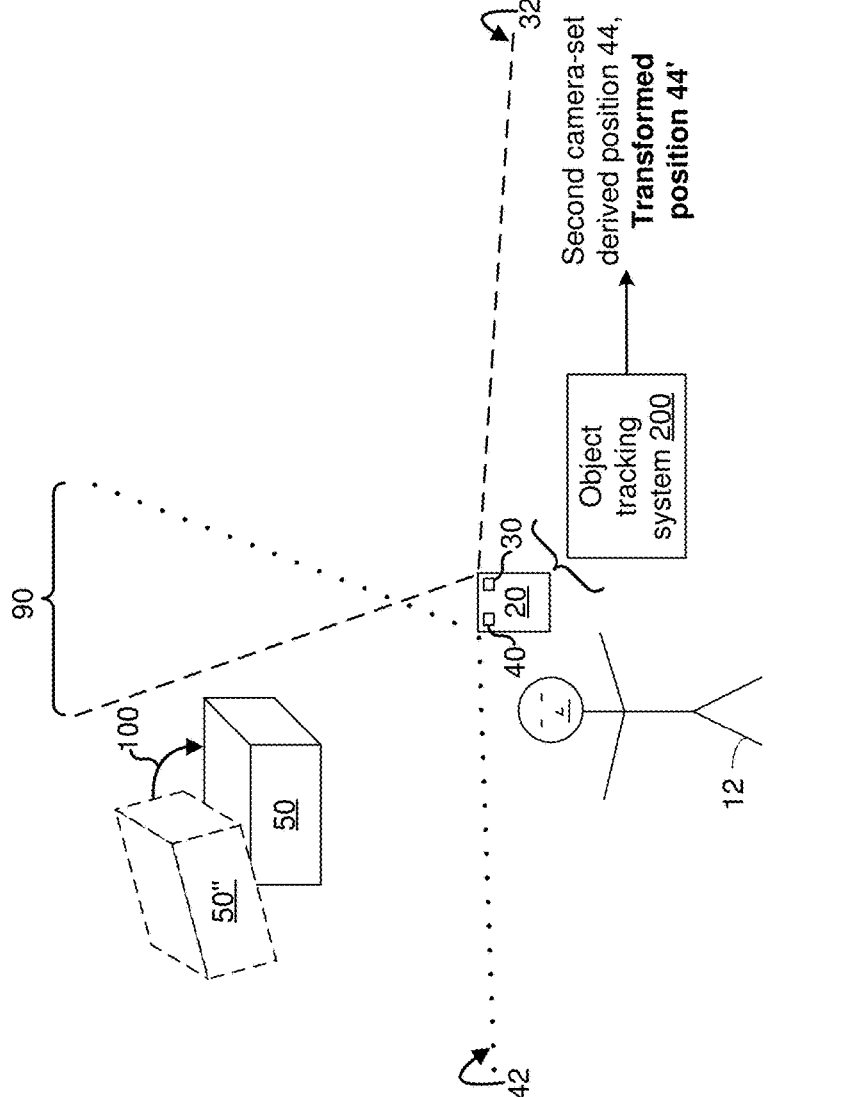
Figure 1C

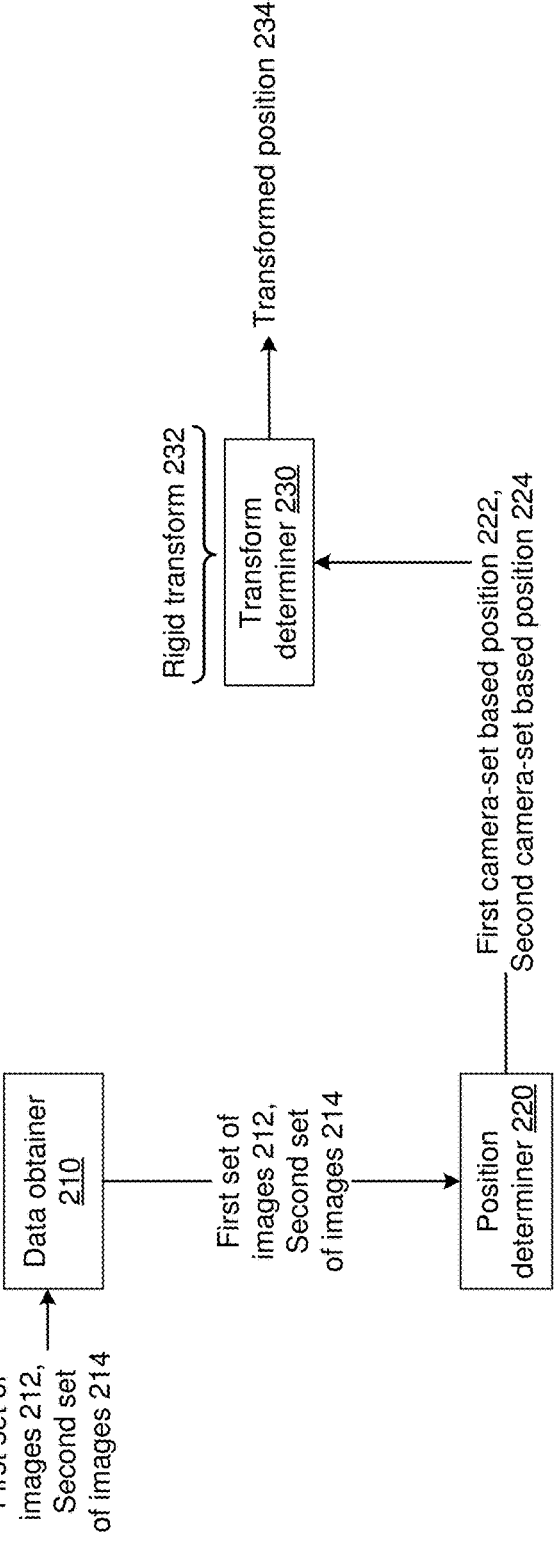
Figure 2

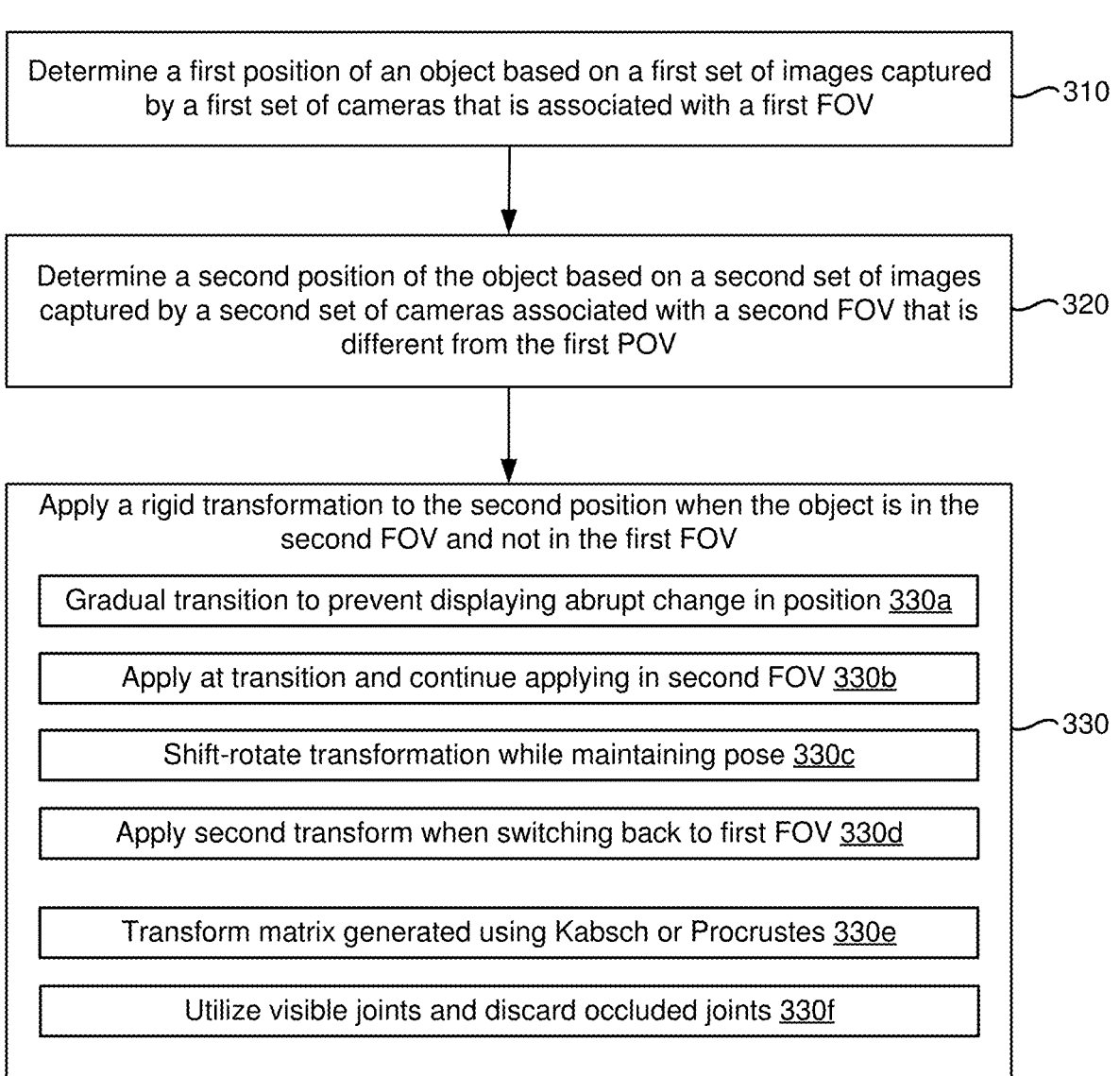

300

Determine a first position of an object based on a first set of images captured by a first set of cameras that is associated with a first FOV — 310

Determine a second position of the object based on a second set of images captured by a second set of cameras associated with a second FOV that is different from the first POV — 320

Apply a rigid transformation to the second position when the object is in the second FOV and not in the first FOV Gradual transition to prevent displaying abrupt change in position 330a Apply at transition and continue applying in second FOV 330b Shift-rotate transformation while maintaining pose 330c Apply second transform when switching back to first FOV 330d Transform matrix generated using Kabsch or Procrustes 330e Utilize visible joints and discard occluded joints 330f

TRANSITIONING BETWEEN SETS OF IMAGE SENSORS

CROSS-REFERENCE TO RELATED APPLICATION

This application claims the benefit of U.S. Provisional Patent App. No. 63/470,744, filed on Jun. 2, 2023, which is incorporated by reference in its entirety.

TECHNICAL FIELD

The present disclosure generally relates to transitioning between sets of image sensors.

BACKGROUND

Some devices include multiple image sensors. A device may use images captured by the image sensors to track an object. For example, the device may use the images captured by the image sensors to determine a position of the object in a physical environment. Images captured by different image sensors may sometimes indicate different positions of the object.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1D are diagrams of an example operating environment in accordance with some implementations.

FIG. 2 is a diagram of an object tracking system in accordance with some implementations.

FIG. 3 is a flowchart representation of a method of transitioning between sets of image sensors in accordance with some implementations.

Figure 1A:
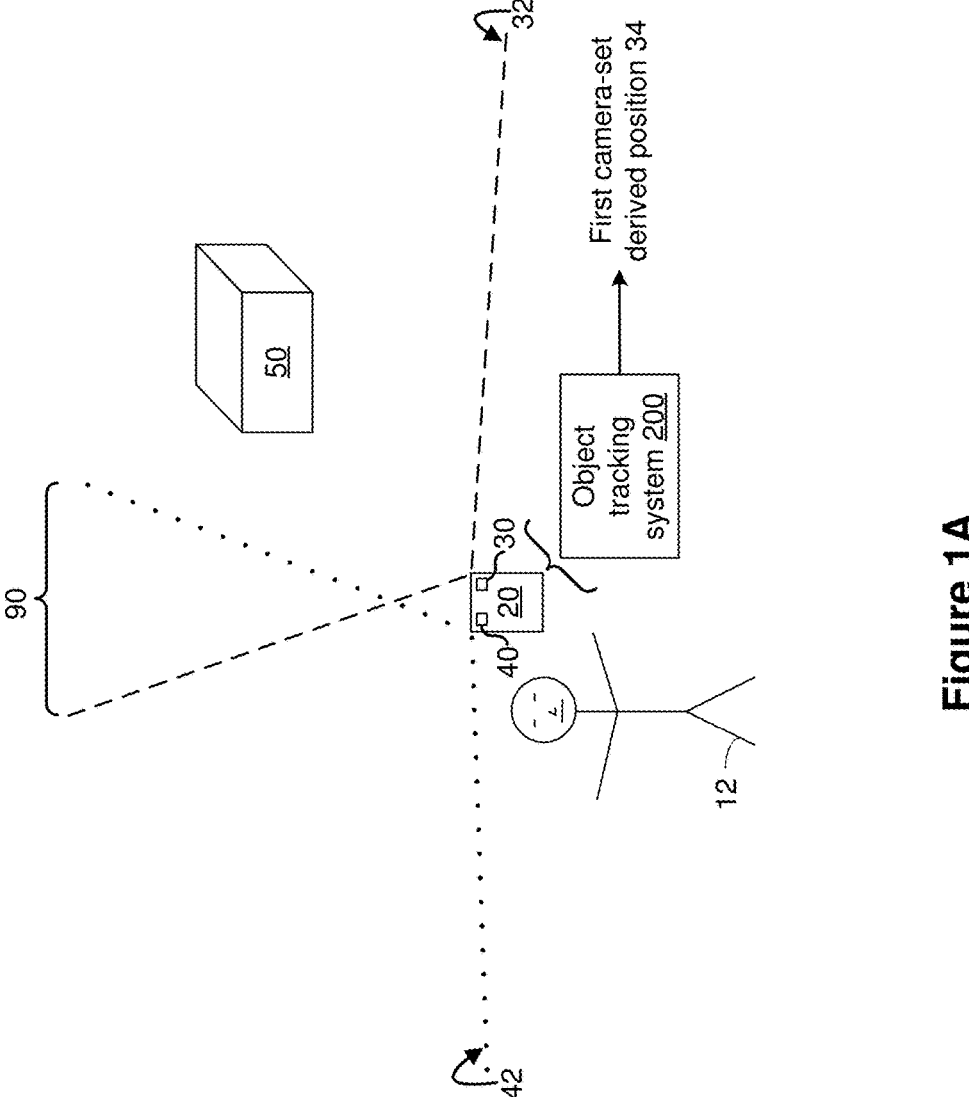

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for transitioning between sets of image sensors. In some implementations, a method is performed by an electronic device including a non-transitory memory, one or more processors, a display and a plurality of image sensors. In various implementations, a method includes determining a first position of an object based on a first set of images captured by a first subset of the plurality of image sensors. The first subset is associated with a first field of view (FOV). In some implementations, the method includes determining a second position of the object based on a second set of images captured by a second subset of the plurality of image sensors. The second subset is associated with a second FOV that is different from the first FOV and the second position is different from the first position. In some implementations, the method includes applying a rigid transformation to the second position when the object is in the second FOV and not in the first FOV.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some devices include various image sensors that operate as stereo cameras. The stereo cameras allow the device to detect an object in a physical environment of the device and/or to track a position of the object in the physical environment of the device. Images captured by each stereo camera may be used to determine a position of the object being tracked. However, as the object and/or the device move, the object may transition between fields of view of different stereo cameras. Since images captured by different stereo cameras may result in different positions of the object, transitioning between different stereo cameras may result in abrupt changes in the positions of the object thereby leading to inaccurate object detection, inaccurate object tracking and/or detracting from a user experience of the device.

The present disclosure provides methods, systems, and/or devices for transitioning between set of image sensors. A device applies a rigid transformation to an object when the object transitions from appearing in a first field of view (FOV) associated with a first set of cameras to a second FOV associated with a second set of cameras. The rigid transformation may include a shift-rotate transformation that includes a rotation and/or a translation of the entire object while maintaining a pose of the object. For example, if the object is a hand that is partially curled, applying the rigid transformation to the hand translates and/or rotates the hand while displaying the hand as being partially curled.

When the object is in the first FOV of the first set of cameras, the device determines a first position for the object based on a first set of images captured by the first set of cameras. However, when the object transitions to the second FOV of the second set of cameras, the device determines a second position for the object based on a second set of images captured by the second set of cameras. Since the first and second positions are determined based on images captured by different sets of cameras, the first and second positions may be different. Applying a rigid transformation to the second position allows the device to display a gradual transition from the first position to the second position thereby preventing display of an abrupt change from the first position to the second position.

The device may continue to apply the rigid transformation to the object until the object transitions back from the second FOV to the first FOV. Continuing to apply the rigid transformation to positions determined based on images captured by the second set of cameras allows the device to compensate (e.g., correct) for positional differences between the first set of cameras and the second set of cameras. The first set of cameras may be designated as a primary set of cameras and the second set of cameras may be designated as a second set of cameras. Hence, continuing to apply the rigid transformation while the device is in the second FOV allows the device to display positions of the object with reference to a point of origin associated with the primary set of cameras even while the object is not in the first FOV. The device may apply a scaling factor as part of the rigid transformation.

When the object transitions back to the first FOV, the device applies a reverse transformation that decays over a relatively short amount of time. The reverse transformation includes another rigid transformation that rotates and/or translates the object without changing a pose of the object. After the reverse transformation decays, the device displays the object at positions determined based on images captured by the first set of cameras without applying a transformation to the positions.

The object may include a body part such as a hand of a person in the physical environment or a hand of a user of the device. The device may apply the rigid transformation to joint positions of the hand. Some joint positions may be associated with a confidence value. For example, joints that are visible may be associated with a relatively high confidence value, whereas joints that are not visible may be associated with a relatively low confidence value. The device may apply the rigid transformation to joint positions that are associated with a relatively high confidence value and forgo applying the rigid transformation to joint positions that are associated with a relatively low confidence value.

The device may determine the transformation based on points that are associated with relatively high confidence values and not based on points that are associated with relatively low confidence values. However, the transformation can be applied to all points including the points that are associated with relatively low confidence values. As such, while points with relatively low confidence values do not contribute to the determination of the transformation, the points with relatively low confidence values benefit from the transformation.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a user 12, an electronic device 20, a physical object 50 ("object 50", hereinafter for the sake of brevity) and an object tracking system 200. In some implementations, the object 50 includes an inanimate object such as a piece of furniture, a robot, a drone, etc. Alternatively, in some implementations, the object 50 includes an animate object such as a person, a user's hand, a dog, a cat, etc.

In various implementations, the electronic device 20 includes numerous image sensors. In some implementations, the image sensors operate in pairs as stereo cameras. In the example of FIG. 1A, the electronic device 20 includes a first camera set 30 that operates as a first stereo camera and a second camera set 40 that operates as a second stereo camera. In some implementations, the first camera set 30 includes two cameras and the second camera set 40 includes two cameras. In some implementations, the first camera set 30 and the second camera set 40 share a camera. For example, the electronic device 20 may include three cameras, the first camera set 30 may include a first one of the three cameras and a second one of the three cameras, and the second camera set 40 may include the second one of the three cameras and a third one of the three cameras. In various implementations, the first camera set 30 is associated with a first field of view (FOV) 32 and the second camera set 40 is associated with a second FOV 42 that is different from the first FOV 32. In the example of FIG. 1A, the object 50 is in the first FOV 32 and not in the second FOV 42. In some implementations, the first FOV 32 and the second FOV 42 overlap. The overlap in the first FOV 32 and the second FOV 42 results in an overlapping region 90. When the object 50 is in the overlapping region 90, a representation of the object 50 appears in images captured by both the first camera set 30 and the second camera set 40.

In various implementations, the object tracking system 200 tracks a position (e.g., a location and/or an orientation) of the object 50 within the physical environment 10 based on images captured by the first camera set 30 and/or the second camera set 40. In FIG. 1A, the object 50 is in the first FOV 32 and not in the second FOV 42. As such, the object 50 appears in images captured by the first camera set 30 and not in images captured by the second camera set 40. In the example of FIG. 1A, the object tracking system 200 generates a first camera-set derived position 34 for the object 50 based on images captured by the first camera set 30.

In some implementations, the first FOV 32 corresponds to (e.g., matches, is the same as, or overlaps with) an FOV of the user 12. For example, in some implementations, the first FOV 32 represents what the user 12 sees. In some implementations, the first FOV 32 corresponds to a central vision field of the user 12. For example, the first FOV 32 represents what the user 12 sees when the user 12 is looking straight ahead. In some implementations, the second FOV 42 corresponds to a portion of a peripheral vision field of the user 12. For example, the second FOV 42 represents what the user 12 may see through his/her peripheral vision.

In some implementations, the object 50 first appears in the first FOV 32, then the object 50 moves to the overlapping region 90 and appears in the first FOV 32 and the second FOV 42. In such implementations, the electronic device 20 (e.g., the object tracking system 200) may assign a greater weight to positions determined based on images captured by the first camera set 30 than positions determined based on images captured by the second camera set 40 because the object 50 was initially in the first FOV 32 and outside the second FOV 42. For example, referring to FIG. 1B, when the object 50 is in the first FOV 32 and the second FOV 42 (e.g., in the overlapping region 90), the object 50 appears in images captured by both the first camera set 30 and the second camera set 40. In this example, the object tracking system 200 may generate the first camera-set derived position 34 and a second camera-set derived position 44 that is based on images captured by the second camera set 40.

However, since positions based on the first camera set 30 may be assigned a greater weight than positions based on the second camera set 40, the object tracking system 200 utilizes the first camera-set derived position 34 (as indicated by the boldface). The object tracking system 200 may discard the second camera-set derived position 44 when the first camera-set derived position 34 is available.

Figure 1B:
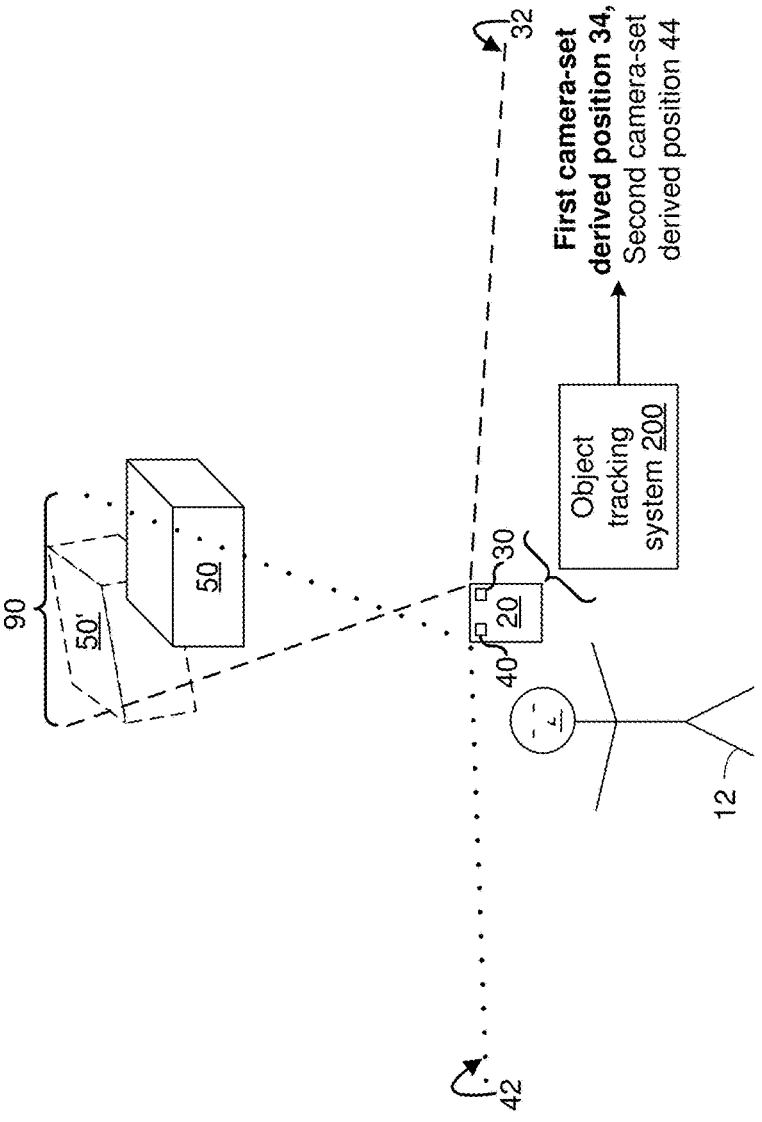

In various implementations, the first camera-set derived position 34 is different from the second camera-set derived position 44, for example, due to differences in camera positions of cameras in the first camera set 30 and the second camera set 40. As such, when the electronic device 20 switches from utilizing the first camera-set derived position 34 to utilizing the second camera-set derived position 44, there may be an abrupt change in a displayed position of the object 50. For example, the object 50 may appear to jump from the first camera-set derived position 34 to the second camera-set derived position 44. FIG. 1B illustrates a dotted representation 50' that represents the second camera-set derived position 44. As can be seen in FIG. 1B, the dotted representation 50' is shifted and rotated relative to the object 50 due to a spatial difference in the first camera-set derived position 34 and the second camera-set derived position 44.

Referring to FIG. 1C, in various implementations, the object tracking system 200 applies a rigid transformation to the object 50 when the object 50 transitions from the first FOV 32 to the second FOV 42. In some implementations, applying the rigid transformation to the second camera-set derived position 44 results in a transformed position 44'. FIG. 1C illustrates a dotted representation 50" that represents the second camera-set derived position 44. In the example of FIG. 1C, the object 50 is shown at the transformed position 44'. As can be seen in FIG. 1C, the object tracking system 200 applies a shift-rotate transformation 100 that shifts and rotates the object 50 in order to display the object 50 at the transformed position 44'. In some implementations, displaying the object 50 at the transformed position 44' avoids an abrupt change in a displayed position of the object 50 from the first camera-set derived position 34 to the second camera-set derived position 44. In some implementations, applying the rigid transformation to the object 50 depicts a movement of the object 50 from the first camera-set derived position 34 to the second camera-set derived position 44 so as to prevent or mitigate an abrupt jump from the first camera-set derived position 34 to the second camera-set derived position 44. In some implementations, applying the rigid transformation visually describes a movement of the object 50 from the first camera-set derived position 34 to the second camera-set derived position 44 thereby preventing a visual jump of the object 50 from the first camera-set derived position 34 to the second camera-set derived position 44.

In various implementations, the object tracking system 200 continues applying the rigid transformation to the object 50 while the object 50 is in the second FOV 42 and outside the first FOV 32. Since the first FOV 32 more closely matches a central field of vision of the user 12, in some implementations, continuing to apply the rigid transformation while the object 50 is in the second FOV 42 and outside the first FOV 32 allows the electronic device 20 to display the object 50 from a point of view that more closely matches the position of the object when perceived from the first FOV 32, e.g., central field of vision of the user 12. In some implementations, continued application of the rigid transformation to the object 50 while the object 50 is in the second FOV 42 and outside the first FOV 32 tends to prevent abrupt changes in a displayed position of the object 50 while the object 50 is solely in the second FOV 42.

Figure 1D:
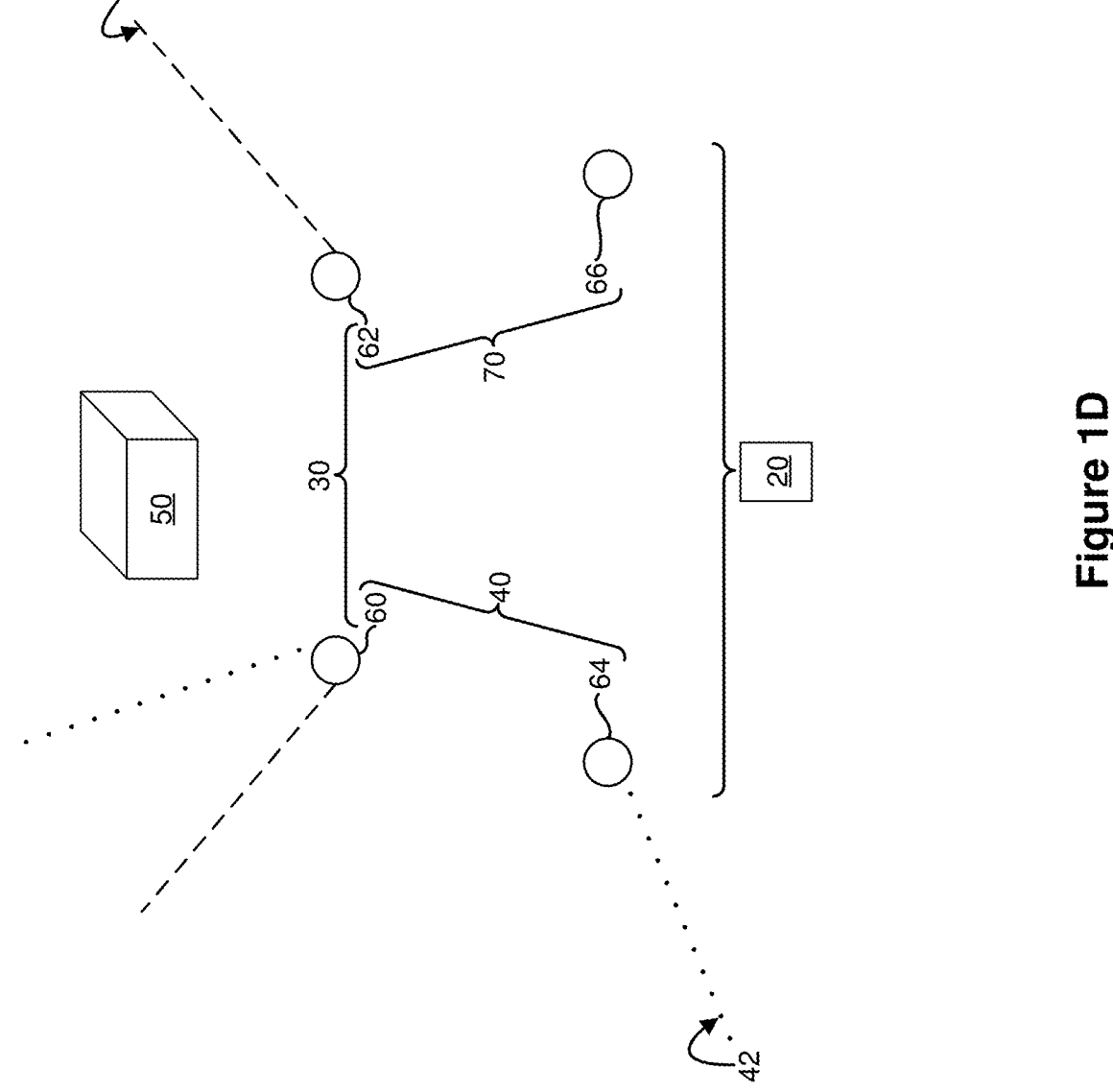

FIG. 1D illustrates an example arrangement of various cameras of the electronic device 20. In the example of FIG. 1D, the electronic device 20 includes four cameras that are arranged into three sets of stereo cameras. In some implementations, the first camera set 30 includes a first camera 60 and a second camera 62, and the first FOV 32 corresponds to a combined FOV of the first camera 60 and the second camera 62. In some implementations, the second camera set 40 includes the first camera 60 and a third camera 64, and the second FOV 42 corresponds to a combined FOV of the first camera 60 and the third camera 64. As can be seen in FIG. 1D, in some implementations, the second FOV 42 is smaller (e.g., narrower) than the first FOV 32, for example, because the second FOV 42 corresponds to (e.g., mimics) a peripheral vision field of the user 12 and the first FOV 32 corresponds to (e.g., mimics) a central vision field of the user 12. In some implementations, the second camera 62 and a fourth camera 66 collectively form a third camera set 70 that is associated with a third FOV (not shown). The third FOV may be similar to the second FOV 42 in size. In some implementations, the first camera set 30 detects objects that are in front of the electronic device 20, the second camera set 40 detects objects that are on one side of the electronic device 20 (e.g., on a left side of the electronic device 20), and the third camera set 70 detects objects that are on another side of the electronic device 20 (e.g., on a right side of the electronic device 20). In various implementations, the three camera sets 30, 40 and 70 operate as three stereo cameras. For example, the first camera set 30 forms a first stereo camera, the second camera set 40 forms a second stereo camera, and the third camera set 70 forms a third stereo camera.

FIG. 2 is a block diagram of the object tracking system 200 in accordance with some implementations. In various implementations, the object tracking system 200 includes a data obtainer 210, a position determiner 220 and a transform determiner 230. In some implementations, the data obtainer 210 obtains images from stereo cameras with different FOVs. In the example of FIG. 2, the data obtainer 210 obtains a first set of images 212 from a first stereo camera with a first FOV (e.g., from the first camera set 30 shown in FIGS. 1A-1D) and a second set of images 214 from a second stereo camera with a second FOV (e.g., from the second camera set 40 shown in FIGS. 1A-1D). The data obtainer 210 provides the first set of images 212 and the second set of images 214 to the position determiner 220.

In various implementations, the position determiner 220 determines respective positions of objects in a physical environment based on the first set of images 212 and/or the second set of images 214. For example, the position determiner 220 determines a location and/or an orientation of the object 50 shown in FIGS. 1A-1D based on the first set of images 212 and/or the second set of images 214. In some implementations, the position determiner 220 determines a first camera-set based position 222 based on the first set of images 212 (e.g., the first camera-set derived position 34 shown in FIGS. 1A and 1B) and a second camera-set based position 224 based on the second set of images 214 (e.g., the second camera-set derived position 44 shown in FIGS. 1B and 1C).

In some implementations, the position determiner 220 performs feature detection and/or extraction in order to identify features in the first set of images 212 and/or the second set of images 214. For example, the position determiner 220 generates point clouds that correspond to objects that are depicted in the first set of images 212 and/or the second set of images 214, and the position determiner 220 determines the respective positions of the objects based on respective locations and/or shapes of the point clouds that correspond to the objects. In various implementations, the position determiner 220 provides the first camera-set based position 222 and the second camera-set based position 224 to the transform determiner 230.

In various implementations, the transform determiner 230 generates a rigid transform 232. In some implementations, the transform determiner 230 generates the rigid transform 232 when the object is in an overlapping region where the first FOV and the second FOV overlap (e.g., the overlapping region 90 shown in FIGS. 1A-1C). When the object is in the overlapping region, the object simultaneously appears in the first set of images 212 and the second set of images 214. As such, when the object is in the overlapping region, the transform determiner 230 determines a spatial difference between the first camera-set based position 222 and the second camera-set based position 224. In some implementations, the spatial difference includes a translational difference and a rotational difference. In some implementations, the rigid transform 232 represents an operation that is to be performed in order to navigate from the second camera-set based position 224 to the first camera-set based position 222 (e.g., in order to reduce the spatial difference between the first camera-set based position 222 and the second camera-set based position 224). Since the spatial difference between the first camera-set based position 222 and the second camera-set based position 224 may include a translational difference, the rigid transform 232 may include a translation operation for going from a 3D coordinate indicated by the second camera-set based position 224 to a 3D coordinate indicated by the first camera-set based position 222. Additionally or alternatively, since the spatial difference between the first camera-set based position 222 and the second camera-set based position 224 may include a rotational difference, the rigid transform 232 may include a rotation operation for rotating from an angular position indicated by the second camera-set based position 224 to an angular position indicated by the first camera-set based position 222.

The transform determiner 230 applies the rigid transform 232 to an object that has transitioned from the first FOV to the second FOV (e.g., from a central FOV of the device to a peripheral FOV of the device, for example, from a primary FOV of the device to a secondary FOV of the device). In various implementations, applying the rigid transform 232 to the object transforms the second camera-set based position 224 into the transformed position 234. For example, referring to FIG. 1C, applying the rigid transform 232 to the object 50 transforms the second camera-set derived position 44 into the transformed position 44' (e.g., as indicated by the shift-rotate transformation 100 in FIG. 1C). In various implementations, the object is displayed at the transformed position 234 in order to avoid an abrupt change in a position from the first camera-set based position 222 to the second camera-set based position 224. In various implementations, displaying the object at the transformed position 234 includes displaying an animation that shows the object moving from the first camera-set based position 222 to the second camera-set based position 224. In various implementations, the rigid transform 232 includes a transform matrix and the transform determiner 230 applies the rigid transform 232 to an object by multiplying the transform matrix with a vector that represents a position of the object. In some implementations, the transform determiner 230 applies the rigid transform 232 to multiple objects (e.g., to all objects) that are in the second FOV.

In some implementations, the transform determiner 230 determines the rigid transform 232 by calculating a Procrustes transformation. Alternatively, in some implementations, the transform determiner 230 determines the rigid transform 232 by calculating a Kabsch-Umeyama transformation. Other techniques for calculating the rigid transform 232 are also contemplated. For example, the transform determiner 230 may utilize other algorithms for determining the rigid transform 232.

In some implementations, the transform determiner 230 computes the Procrustes transformation between an object just after a transition from a first FOV to a second FOV and the object extrapolated from a previous frame. For example, referring to FIGS. 1B and 1C, the Procrustes transformation is between the first camera-set derived position 34 and the second camera-set derived position 44. In some implementations, the transform determiner 230 computes the Procrustes transformation in accordance with expression 1 provided below.

$$S_{orig} = \begin{pmatrix} l & T \\ 0 & 1 \end{pmatrix} X \begin{pmatrix} R & 0 \\ 0 & 1 \end{pmatrix} \qquad \text{(Expression 1)}$$

In expression 1, I represents a position of the object in the first FOV, T represents a translation factor and R represents a rotational factor. In some implementations, the transform determiner 230 applies the computed transformation $S_{orig}$ on the object until a subsequent transition of the object from the second FOV to the first FOV. In some implementations, when the object subsequently transitions from the second FOV to the first FOV, the transform determiner 230 determines a new transformation and applies the new transformation in a decaying manner. In some implementations, the transform determiner 230 determines the new transformation in accordance with expression 2 provided below.

$$S_{new} = \qquad \text{(Expression 2)}$$
$$\begin{pmatrix} l & \alpha T \\ 0 & 1 \end{pmatrix} X \text{ matrix(Slerp(quaternion}(R), \text{quaternion}(I), \alpha))$$

In expression 2, the transform determiner 230 slowly increases a from 0 to 1 during frames. For example, the transform determiner 230 gradually increases a in order to prevent abrupt changes to a displayed position of the object.

FIG. 3 is a flowchart representation of a method 300 for transitioning between sets of image sensors. In various implementations, the method 300 is performed by the electronic device 20 shown in FIGS. 1A-1D and/or the object tracking system 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining a first position of an object based on a first set of images captured by a first subset of the plurality of image sensors. In some implementations, the first subset of the plurality of image sensors is associated with a first field of view (FOV). In some implementations, the device utilizes a first stereo camera to capture the first set of images and determines a first position of the object based on the first set of images. For example, as shown in FIG. 1A, the object tracking system 200 generates the first camera-set derived position 34 for the object 50 based on images captured by the first camera set 30.

In some implementations, the object is a body part with a plurality of joints, the first position includes a first set of joint positions for the plurality of joints, and the second position includes a second set of joint positions for the plurality of joints. As an example, referring to FIG. 1A, the object 50 may include a person that is in the physical environment 10 and the object tracking system 200 may be tracking a position of the person within the physical environment 10. In this example, the device may track a position of an entirety of the person or a position of a particular body part such as a hand of the person. Alternatively, in some implementations, the object is an inanimate object with a plurality of detectable features, the first position includes a first set of positions for the plurality of detectable features, and the second position includes a second set of positions for the plurality of detectable features. For example, the device may perform feature detection and/or extraction to identify edges and/or corners of the object, and track respective positions of the edges and/or the corners of the object.

As represented by block 320, in various implementations, the method 300 includes determining a second position of the object based on a second set of images captured by a second subset of the plurality of image sensors. The second subset of the plurality of image sensors is associated with a second FOV that is different from the first FOV and the second position is different from the first position. In some implementations, the device utilizes a second stereo camera to capture the second set of images and determines a second position of the object based on the second set of images. For example, as shown in FIG. 1B, the object tracking system 200 generates the second camera-set derived position 44 for the object 50 based on images captured by the second camera set 40.

As represented by block 330, in various implementations, the method 300 includes applying a rigid transformation to the second position when the object is in the second FOV and not in the first FOV. As an example, the device applies the rigid transformation to the object in response to determining that the object has transitioned out of a first FOV of a first stereo camera and is solely in a second FOV of a second stereo camera. In this example, when the object is solely in the second FOV, the device can no longer utilize images from the first stereo camera and has to rely on images captured by the second stereo camera to track the object. In order to prevent displaying a jump in a position of the object when switching from a first position determined based on images captured from the first stereo camera to a second position determined based on images captured from the second stereo camera, the device applies the rigid transformation to the second position and displays the object at a transformed position. For example, as described in relation to FIG. 1C, the electronic device 20 displays the object 50 at the transformed position 44' instead of the second camera-set derived position 44 in order to avoid displaying an abrupt jump from the first camera-set derived position 34 to the second camera-set derived position 44.

In various implementations, an overlap of the first FOV and the second FOV results in an overlapping region, and the method 300 includes determining the rigid transformation when the object is in the overlapping region. For example, referring to FIG. 1B, the object tracking system 200 determines the rigid transformation when the object 50 is in the overlapping region 90. In various implementations, the method 300 includes generating the rigid transformation at a first time when the object is in an overlapping region where the first FOV and the second FOV overlap, and applying the rigid transformation to the object at a second time that occurs after the first time when the object is outside the overlapping region and solely in the second FOV.

In some implementations, the rigid transformation is based on a spatial difference between the first position and the second position while the object is in an overlapping region where the first FOV and the second FOV overlap. For example, referring to FIG. 1B, the rigid transformation is based on a difference between the first camera-set derived position 34 and the second camera-set derived position 44. In some implementations, the spatial difference includes a translational difference and the rigid transformation includes a translational component to negate the translational difference. In some implementations, the spatial difference includes a rotational difference and the rigid transformation includes a rotational component to negate the rotational difference.

In some implementations, the object represents a hand of a user of the electronic device, and applying the rigid transformation comprises applying the rigid transformation on the hand when the user is in a communication session. In some implementations, the communication session is an in-person communication session (e.g., a face-to-face communication session). In some implementations, the device displays a virtual representation of the hand and applies the rigid transformation to the virtual representation of the hand when the hand exits an overlapping region where the first FOV and the second FOV overlap.

As represented by block 330a, in some implementations, applying the rigid transformation results in a gradual transition of the object from the first position to the second position and prevents displaying an abrupt change from the first position to the second position. For example, referring to FIG. 1C, displaying the object 50 at the transformed position 44' prevents the electronic device 20 from displaying the object 50 as having jumped from the first camera-set derived position 34 to the second camera-set derived position 44 in two consecutive frames. Instead, applying the rigid transformation allows the device to display a gradual transition of the object from the first camera-set derived position 34 to the second camera-set derived position 44 over a series of frames.

As represented by block 330b, in some implementations, applying the rigid transformation includes detecting a movement of the object out of the first FOV while remaining in the second FOV and applying the rigid transformation in response to detecting the movement out of the first FOV. In some implementations, the device applies the rigid transformation immediately upon the object exiting the first FOV in order to avoid displaying an abrupt change in the position of the object in consecutive video frames. For example, with reference to FIGS. 1B and 1C, the electronic device 20 applies the rigid transformation to the object 50 when the object 50 stops appearing in the first FOV 32.

In some implementations, applying the rigid transformation includes maintaining application of the rigid transformation while the object is in the second FOV and outside of the first FOV. In some implementations, the device continues to apply the rigid transform to the object until the object reenters the first FOV. For example, the device ceases to apply the rigid transformation when the device subsequently detects the object in images captured by the first stereo camera. As another example, referring to FIG. 1C, the electronic device 20 continues to display the object 50 at the transformed position 44' instead of the second camera-set derived position 44 until the object 50 reenters the first FOV 32.

As represented by block 330c, in some implementations, the rigid transformation is a shift-rotate transformation that includes a combination of a three-dimensional (3D) rotation and a 3D translation of the object. In some implementations, applying the rigid transformation includes rotating and/or translating the object while maintaining a pose of the object. As an example, if the object is a hand of a person and the hand is curled, applying the rigid transformation maintains the hand in the same curled position. In this example, applying the rigid transformation rotates and/or translates the curled hand without uncurling the hand or further curling the hand.

As represented by block 330d, in some implementations, the method 300 includes ceasing application of the rigid transformation when the object subsequently appears in the first FOV, and applying, for a period of time, a second rigid transformation to a third position that is determined based on a third set of images captured by the first subset of the plurality of image sensors. For example, referring to FIG. 1C, if the object 50 reenters the first FOV 32, the object tracking system 200 stops applying the rigid transformation to the object 50 that results in the transformed position 44'. In some implementations, the second rigid transformation decays over the period of time. In some implementations, the second rigid transformation is a reverse transformation of the rigid transformation that is applied to the second position when the object first appeared in the second FOV. For example, referring to FIG. 1C, if the object 50 reenters the first FOV 32, the object tracking system 200 generates another rigid transformation that is applied to the object 50 for a relatively short amount of time. After the second rigid transformation decays, the device displays the object at a position determined based on the images captured by the first subset of the plurality of image sensors. For example, after an object reenters an FOV of a primary stereo camera, the device applies a decaying rigid transform and transitions to displaying the object at a position determined based on images captured by the primary stereo camera.

As represented by block 330e, in some implementations, applying the rigid transformation includes generating a transform matrix and multiplying the second position with the transform matrix. In some implementations, applying the rigid transformation includes generating a transform by utilizing a Kabsch-Umeyama algorithm. In some implementations, applying the rigid transformation includes generating a transform by utilizing a Procrustes algorithm. Other algorithms for generating a rigid transformation are also contemplated.

As represented by block 330f, in some implementations, the object is a body part with a plurality of joints, the first position includes a first set of joint positions for the plurality of joints, and the second position includes a second set of joint positions for the plurality of joints. In some implementations, applying the rigid transformation includes applying the rigid transformation to a subset of the second set of joint positions that are associated with confidence values that are greater than a threshold confidence value, and forgo applying the rigid transformation to a remainder of the second set of joint positions that are associated with confidence values that are less than the threshold confidence value. In some implementations, the device associates respective confidence values with joint positions of an object. In such implementations, the device may apply the rigid transformation to joints with joint positions associated with relatively high confidence values (e.g., greater than a threshold confidence value) and the device forgoes applying the rigid transformation to joints with joint positions associated with relatively low confidence values (e.g., less than the threshold confidence value). In some implementations, the subset of the second set of joint positions corresponds to joints that are visible, and the remainder of the second set of joint positions corresponds to joints that are occluded. For example, the device may apply the rigid transformation to joints that are visible and forgo applying the rigid transformation to joints that are not visible (e.g., due to a lack of line of sight between the joints and the cameras capturing the images).

In some implementations, the user of the device is communicating with a person in a physical environment of the device while the user is using the device (e.g., while holding the device or wearing the device on his/her head). For example, the user and the person are talking face-to-face. The device may display a virtual representation of the user (e.g., an avatar of the user). The avatar may include virtual hands that represent hands of the user. As the user gesticulates while talking with the person, the device can display a movement of the virtual hands of the avatar to mimic the movement of the user's hands. The user's hands may move in and out of the FOVs of different stereo cameras of the device. In this example, the device determines a rigid transformation when the user's hands are in an overlapping region where a first FOV of a first stereo camera overlaps with a second FOV of a second stereo camera. When the user's hands exit the overlapping region and are solely in the second FOV, the device applies the rigid transformation to the virtual hands in order to prevent displaying an abrupt jump in the position of the virtual hands. In some implementations, the person that the user is communicating with is using a second device. In such implementations, the device may transmit hand tracking data to the second device. The hand tracking data transmitted to the second device may include hand positions determined based on images captured by multiple stereo cameras and transforms applied to the positions.

Figure 4:
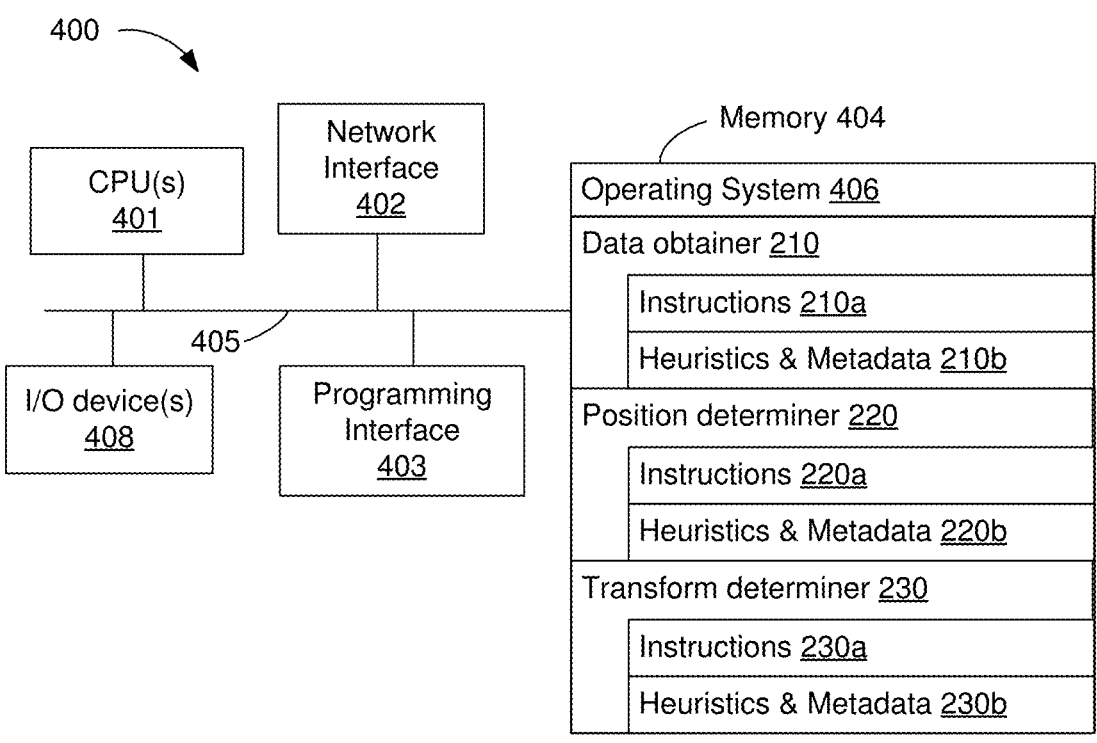
FIG. 4 is a block diagram of a device that transitions between sets of image sensors in accordance with some implementations.

FIG. 4 is a block diagram of a device 400 in accordance with some implementations. In some implementations, the device 400 implements the electronic device 20 shown in FIGS. 1A-1C and/or the object tracking system 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display. In some implementations, the display includes an extended reality (XR) display. In some implementations, the display includes an opaque display. Alternatively, in some implementations, the display includes an optical see-through display. In some implementations, the one or more I/O devices 408 include image sensors (e.g., the first camera set 30, the second camera set 40 and the third camera set 70 shown in FIG. 1D). The image sensors may include visible light cameras and/or an infrared light cameras for capturing image data. The image sensors operate in pairs as stereo cameras. As such, in various implementations, the one or more I/O devices 408 include multiple stereo cameras (e.g., a first stereo camera, a second stereo camera, a third stereo camera, etc.).

In some implementations, the memory 404 or the non-transitory computer readable storage medium of the memory 404 stores the following programs, modules and data structures, or a subset thereof including an optional operating system 406, the data obtainer 210, the position determiner 220 and the transform determiner 230.

In various implementations, the data obtainer 210 includes instructions 210a, and heuristics and metadata 210b for obtaining images of a physical environment from different sets of image sensors (e.g., the first set of images 212 shown in FIG. 2 from the first camera set 30 shown in FIGS. 1A-1D and the second set of images 214 shown in FIG. 2 from the second camera set 40 shown in FIGS. 1A-1D). In some implementations, the position determiner 220 includes instructions 220a, and heuristics and metadata 220b for detecting respective positions of objects depicted in the images obtained by the data obtainer 210 (e.g., the first camera-set derived position 34 and the second camera-set derived position 44 shown in FIG. 1B). In some implementations, the transform determiner 230 includes instructions 230a, and heuristics and metadata 230b for applying a rigid transformation to an object while the object is outside an FOV of a particular one of the stereo cameras (e.g., for applying the rigid transform 232 shown in FIG. 2 and/or for generating the transformed position 44' shown in FIG. 1C).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at an electronic device including a non-transitory memory, one or more processors, a display and a plurality of image sensors:

determining a first position of an object based on a first set of images captured by a first subset of the plurality of image sensors, wherein the first subset of the plurality of image sensors is associated with a first field of view (FOV);

determining a second position of the object based on a second set of images captured by a second subset of the plurality of image sensors, wherein the second subset of the plurality of image sensors is associated with a second FOV that is different from the first FOV and the second position is different from the first position; and applying a rigid transformation to the second position when the object is in the second FOV and outside of the first FOV.

2. The method of claim 1, wherein applying the rigid transformation results in a gradual transition of the object from the first position to the second position and prevents displaying an abrupt change from the first position to the second position.

3. The method of claim 1, wherein applying the rigid transformation comprises detecting a movement of the object out of the first FOV while remaining in the second FOV and applying the rigid transformation in response to detecting the movement out of the first FOV.

4. The method of claim 1, wherein applying the rigid transformation comprises maintaining application of the rigid transformation while the object is in the second FOV and outside of the first FOV.

5. The method of claim 1, wherein the rigid transformation is a shift-rotate transformation that includes a combination of a three-dimensional (3D) rotation and a 3D translation of the object.

6. The method of claim 1, wherein applying the rigid transformation comprises rotating and/or translating the object while maintaining a pose of the object.

7. The method of claim 1, further comprising ceasing application of the rigid transformation when the object subsequently appears in the first FOV; and applying, for a period of time, a second rigid transformation to a third position that is determined based on a third set of images captured by the first subset of the plurality of image sensors.

8. The method of claim 7, wherein the second rigid transformation decays over the period of time.

9. The method of claim 7, wherein the second rigid transformation is a reverse transformation of the rigid transformation that is applied to the second position when the object appears in the second FOV.

10. The method of claim 1, wherein applying the rigid transformation comprises generating a transform matrix and multiplying the second position with the transform matrix.

11. The method of claim 1, wherein applying the rigid transformation comprises generating a transform by utilizing a Kabsch-Umeyama algorithm.

12. The method of claim 1, wherein applying the rigid transformation comprises generating a transform by utilizing a Procrustes algorithm.

13. The method of claim 1, wherein the object is a body part with a plurality of joints, the first position includes a first set of joint positions for the plurality of joints, and the second position includes a second set of joint positions for the plurality of joints.

14. The method of claim 13, wherein applying the rigid transformation comprises:

applying the rigid transformation to a subset of the second set of joint positions that are associated with confidence values that are greater than a threshold confidence value; and forgo applying the rigid transformation to a remainder of the second set of joint positions that are associated with confidence values that are less than the threshold confidence value.

15. The method of claim 14, wherein the subset of the second set of joint positions corresponds to joints that are visible, and the remainder of the second set of joint positions corresponds to joints that are occluded.

16. The method of claim 1, wherein the object is an inanimate object with a plurality of detectable features, the first position includes a first set of positions for the plurality of detectable features, and the second position includes a second set of positions for the plurality of detectable features.

17. The method of claim 1, wherein an overlap of the first FOV and the second FOV results in an overlapping region; and wherein the method further comprises determining the rigid transformation when the object is in the overlapping region.

18. The method of claim 1, wherein the object represents a hand of a user of the electronic device; and wherein applying the rigid transformation comprises applying the rigid transformation when the user is in a communication session.

19. A device comprising:

a display;

a plurality of image sensors;

one or more processors;

a non-transitory memory; and one or more programs stored in the non-transitory memory, which, when executed by the one or more processors, cause the device to:

determine a first position of an object based on a first set of images captured by a first subset of the plurality of image sensors, wherein the first subset of the plurality of image sensors is associated with a first field of view (FOV);

determine a second position of the object based on a second set of images captured by a second subset of the plurality of image sensors, wherein the second subset of the plurality of image sensors is associated with a second FOV that is different from the first FOV and the second position is different from the first position; and apply a rigid transformation to the second position when the object is in the second FOV and outside of the first FOV.

20. A non-transitory memory storing one or more programs, which, when executed by one or more processors of a device with a plurality of image sensors, cause the device to:

determine a first position of an object based on a first set of images captured by a first subset of the plurality of image sensors, wherein the first subset of the plurality of image sensors is associated with a first field of view (FOV);

determine a second position of the object based on a second set of images captured by a second subset of the plurality of image sensors, wherein the second subset of the plurality of image sensors is associated with a second FOV that is different from the first FOV and the second position is different from the first position; and apply a rigid transformation to the second position when the object is in the second FOV and outside of the first FOV.

* * * * *